United States Patent
Kuroki et al.

(10) Patent No.: US 9,409,576 B2
(45) Date of Patent: Aug. 9, 2016

(54) VEHICLE TRAVEL CONTROLLER

(71) Applicants: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP); Yasunari Kido, Hadano (JP)

(72) Inventors: Rentaro Kuroki, Susono (JP); Takuya Hirai, Susono (JP); Masaki Mitsuyasu, Kawasaki (JP); Jonggap Kim, Hadano (JP); Masaki Matsunaga, Odawara (JP); Takeaki Suzuki, Susono (JP); Takayuki Kogure, Susono (JP); Yukari Okamura, Gotenba (JP); Akihiro Sato, Nagoya (JP); Yusuke Kinoshita, Toyota (JP); Yasunari Kido, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/439,385

(22) PCT Filed: Oct. 31, 2012

(86) PCT No.: PCT/JP2012/078233
§ 371 (c)(1),
(2) Date: Apr. 29, 2015

(87) PCT Pub. No.: WO2014/068725
PCT Pub. Date: May 8, 2014

(65) Prior Publication Data
US 2015/0274168 A1 Oct. 1, 2015

(51) Int. Cl.
*G06F 7/70* (2006.01)
*G06F 19/00* (2011.01)
(Continued)

(52) U.S. Cl.
CPC ......... *B60W 30/18136* (2013.01); *B60W 10/02* (2013.01); *B60W 10/06* (2013.01);
(Continued)

(58) Field of Classification Search
CPC ......... B60T 8/1755; B60T 8/172; B60T 7/22; B60W 10/184; B60W 10/18
USPC .......................................................... 701/70
See application file for complete search history.

(56) References Cited

U.S. PATENT DOCUMENTS 5,961,418 A 10/1999 Taniguchi et al.
8,394,001 B2 3/2013 Tsutsui et al.
(Continued)

FOREIGN PATENT DOCUMENTS

JP 10-181388 A 7/1998
JP 2002 227885 8/2002
(Continued)

OTHER PUBLICATIONS

International Search Report Issued Dec. 4, 2012 in PCT/JP2012/078233 Filed Oct. 31, 2012.
(Continued)

*Primary Examiner* — Maceeh Anwari
(74) *Attorney, Agent, or Firm* — Oblon, McClelland, Maier & Neustadt, L.L.P (57) ABSTRACT

A running control device of a vehicle including an engine, a brake operation member, and a brake booster, is configured to execute an engine brake running mode performed with the engine coupled to wheels and an inertia running mode performed with an engine brake force made lower than that in the engine brake running mode. The running control device executes first and second inertia running modes. The first inertia running mode is terminated when a brake request amount becomes equal to or greater than a predefined first determination value while the first inertia running mode is performed. The second inertia running mode is terminated and a return to the engine brake running mode is made when the brake request amount becomes equal to or greater than a predefined second determination value larger than the first determination value while the second inertia running mode is performed.

7 Claims, 9 Drawing Sheets

(51) Int. Cl.
  *G06G 7/00* (2006.01)
  *G06G 7/76* (2006.01)
  *B60W 30/18* (2012.01)
  *B60W 10/02* (2006.01)
  *B60W 10/06* (2006.01)
  *B60W 10/18* (2012.01)
  *B60W 10/184* (2012.01)
  *B60W 10/188* (2012.01)
  *F16D 48/06* (2006.01)
  *F02D 29/02* (2006.01)
  *F16H 61/21* (2006.01)

(52) U.S. Cl.
  CPC ............ *B60W 10/18* (2013.01); *B60W 10/184* (2013.01); *B60W 10/188* (2013.01); *B60W 30/18072* (2013.01); *F16D 48/066* (2013.01); *B60W 2030/1809* (2013.01); *B60W 2510/069* (2013.01); *B60W 2510/18* (2013.01); *B60W 2540/12* (2013.01); *F02D 29/02* (2013.01); *F16D 2500/1085* (2013.01); *F16D 2500/3067* (2013.01); *F16D 2500/3101* (2013.01); *F16D 2500/3127* (2013.01); *F16D 2500/3165* (2013.01); *F16D 2500/5029* (2013.01); *F16D 2500/5085* (2013.01); *F16D 2500/50676* (2013.01); *F16D 2500/50858* (2013.01); *F16H 61/21* (2013.01)

(56) References Cited

U.S. PATENT DOCUMENTS

| | | | |
|---|---|---|---|
| 2007/0102208 | A1 | 5/2007 | Okuda et al. |
| 2011/0245005 | A1 | 10/2011 | Tsutsui et al. |
| 2011/0270501 | A1 | 11/2011 | Ito et al. |
| 2015/0006045 | A1 | 1/2015 | Motozono et al. |
| 2015/0149058 | A1 | 5/2015 | Kim et al. |
| 2015/0166065 | A1 | 6/2015 | Kuroki et al. |
| 2015/0191172 | A1 | 7/2015 | Kim |
| 2015/0291171 | A1 | 10/2015 | Kuroki et al. |
| 2015/0307103 | A1 | 10/2015 | Kuroki et al. |
| 2016/0084376 | A1 | 3/2016 | Kim et al. |

FOREIGN PATENT DOCUMENTS

| | | | |
|---|---|---|---|
| JP | 2005-226701 A | | 8/2005 |
| JP | 2011173475 | * | 8/2011 |
| JP | 2011 173475 | | 9/2011 |
| JP | 2012 164277 | | 8/2012 |
| WO | 2011 135725 | | 11/2011 |

OTHER PUBLICATIONS

Office Action issued on Apr. 8, 2016 in U.S. Appl. No. 14/414,593.

\* cited by examiner

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | DRIVEN ROTATION | ENGAGED | LARGE | PRESENT |
| FREE-RUN INERTIA RUNNING | F/C; ROTATION STOP | RELEASED | SMALL | ABSENT |
| NEUTRAL INERTIA RUNNING | IDLE ROTATION | RELEASED | SMALL | PRESENT |

| RUNNING MODE | ENGINE 12 | CLUCH C1 | ENGINE BRAKE FORCE | NEGATIVE PRESSURE SUPPLY |
|---|---|---|---|---|
| ENGINE BRAKE RUNNING | DRIVEN ROTATION | ENGAGED | LARGE | PRESENT |
| FREE-RUN INERTIA RUNNING | F/C; ROTATION STOP | RELEASED | SMALL | ABSENT |
| CYLINDER RESTING INERTIA RUNNING | F/C; DRIVEN ROTATION | ENGAGED | MEDIUM | PRESENT |

FIG.10

VEHICLE TRAVEL CONTROLLER

TECHNICAL FIELD

The present invention relates to a running control device of a vehicle and particularly to a technique of further improving fuel consumption while ensuring an amplification effect on a brake force at the time of a brake operation in a vehicle configured to execute an inertia running mode performed with an engine brake force made lower than that of an engine brake running mode.

BACKGROUND ART

With regard to an engine brake running mode performed with engine brake applied by driven rotation of an engine while the engine is coupled to wheels, an inertia running mode performed with an engine brake force made lower than that of the engine brake running mode is conceived for extending a running distance and improving fuel consumption. A device described in Patent Document 1 is an example thereof and, two types of control modes are proposed as (a) a first inertia running mode performed with rotation of the engine stopped and (b) a second inertia running mode performed with the engine kept rotating. Specifically, the first inertia running mode is free-run inertia running in which a clutch is released to separate the engine from the wheels while fuel supply to the engine is stopped to stop rotation, and the second inertia running mode is a neutral inertia running mode in which fuel is supplied to operate the engine while a clutch is released to separate the engine from the wheels. The inertia running mode is performed in either mode without particular distinction under certain conditions.

PRIOR ART DOCUMENT

Patent Document

Patent Document 1: Japanese Laid-Open Patent Publication No. 2002-227885

SUMMARY OF THE INVENTION

Problem to be Solved by the Invention

In the Patent Document 1, when an operation amount of a brake pedal, i.e., a brake request amount, becomes equal to or greater than a predetermined value, the control mode of the inertia running mode is canceled without distinction between the two types of the inertia running modes. Since the operation of the brake pedal means a speed reduction request from a driver, the vehicle is returned from the inertia running mode to the engine brake running mode.

Although not described in Patent Document 1, brake performance is different between the first inertia running mode and the second inertia running mode associated with different engine states. However, since the first inertia running mode and the second inertia running mode are canceled without distinction, the technique of Patent Document 1 has room for improvement in achieving an improvement in fuel consumption while ensuring a braking force at the time of a brake operation. In particular, although a vehicle generally includes a brake booster amplifying a brake force by using a negative pressure generated by rotation of the engine, the brake booster cannot be charged with a negative pressure in the first inertia running mode since the rotation of the engine is stopped, resulting in a reduction in an amplification effect on a brake force due to repeated operations of the brake, while the brake booster is successively charged with a negative pressure in the second inertia running mode since the engine is kept rotating and, therefore, the amplification effect on the brake force is continuously acquired. If an execution condition is defined in accordance with one of the characteristics regardless of the difference in a characteristic of the brake performance, this leads to a problem that a fuel consumption improvement effect is restrained although the amplification effect on the brake force can be ensured, or that the amplification effect on the brake force is reduced although fuel consumption is improved. In short, the first inertia running mode and the second inertia running mode have advantage and disadvantage in terms of the amplification effect on the brake force and the fuel consumption and, therefore, if the both types of the inertia running modes are performed, it is important to properly use the respective types.

The present invention was conceived in view of the situations and it is therefore an object of the present invention to further improve fuel consumption while ensuring an amplification effect on a brake force at the time of a brake operation in a vehicle configured to execute an inertia running mode performed with an engine brake force made lower than that of an engine brake running mode.

Means for Solving the Problem

To achieve the object, the first aspect of the invention provides (a) a running control device of a vehicle including an engine, a brake operation member operated depending on a brake request amount of a driver, and a brake booster amplifying a brake force by using a negative pressure generated by rotation of the engine, (b) the running control device of a vehicle being configured to execute an engine brake running mode performed with the engine coupled to wheels such that an engine brake is applied by driven rotation of the engine and an inertia running mode performed with an engine brake force made lower than that in the engine brake running mode, the brake request amount being included as a condition for terminating the inertia running mode, (c) the running control device of a vehicle executing a first inertia running mode performed with the rotation of the engine stopped and a second inertia running mode performed with the engine kept rotating in accordance with predefined respective execution conditions as the inertia running mode, (d) the first inertia running mode being terminated when the brake request amount becomes equal to or greater than a predefined first determination value $\alpha$ while the first inertia running mode is performed, (e) the second inertia running mode being terminated and a return to the engine brake running mode being made when the brake request amount becomes equal to or greater than a predefined second determination value $\beta$ larger than the first determination value $\alpha$ while the second inertia running mode is performed.

The second aspect of the invention provides the running control device of a vehicle recited in the first aspect of the invention, wherein each of the first determination value $\alpha$ and the second determination value $\beta$ is set depending on a road gradient and is defined to have a smaller value in the case of a down-slope as compared to a flat road.

The third aspect of the invention provides the running control device of a vehicle recited in the first or second aspect of the invention, wherein each of the first determination value $\alpha$ and the second determination value $\beta$ is set depending on a road gradient and is defined to have a larger value in the case of an up-slope as compared to a flat road.

The fourth aspect of the invention provides the running control device of a vehicle recited in any one of the first to third aspects of the invention, wherein a shift to the second inertia running mode is made when the brake request amount becomes equal to or greater than the first determination value α during the first inertia running mode.

The fifth aspect of the invention provides the running control device of a vehicle recited in any one of the first to third aspects of the invention, wherein a return to the engine brake running mode is made when the brake request amount becomes equal to or greater than the first determination value α during the first inertia running mode.

The sixth aspect of the invention provides the running control device of a vehicle recited in any one of the first to fifth aspects of the invention, wherein (a) the first inertia running mode is a free-run inertia running mode in which the engine is separated from the wheels with fuel supply to the engine stopped to stop rotation of the engine, and wherein (b) the second inertia running mode is a neutral inertia running mode in which fuel is supplied to operate the engine while the engine is separated from the wheels.

In the neutral inertia running mode, although the engine is operated by supplying fuel and therefore, this deteriorates the fuel consumption as compared to the free-run inertia running mode, since the engine is disconnected from the wheels, the engine brake force is substantially zero, the distance of the inertia running mode becomes longer and a frequency of reacceleration is reduced and thus, overall fuel consumption can be improved as compared to the engine brake running mode.

The seventh aspect of the invention provides the running control device of a vehicle recited in any one of the first to fifth aspects of the invention, wherein (a) the first inertia running mode is a free-run inertia running mode in which the engine is separated from the wheels with fuel supply to the engine stopped to stop rotation of the engine, and wherein (b) the second inertia running mode is a cylinder resting inertia running mode in which fuel supply to the engine is stopped with the engine coupled to the wheels while operation of a piston and intake/exhaust valves of at least one of multiple cylinders of the engine is stopped.

In the cylinder resting inertia running mode, although the crankshaft is driven to rotate depending on the vehicle speed etc., the engine brake force is reduced by only a portion without a loss (rotation resistance) due to a pumping action when the piston is stopped. Also when the intake/exhaust valves are stopped in the closed valve state or the opened valve state, a loss due to a pumping action becomes smaller as compared to the case of opening/closing in synchronization with the crankshaft, and the engine brake force is reduced.

In the seventh aspect of the invention, since only some of the multiple cylinders of the engine are rested and the remaining cylinders are opened and closed in synchronization with the crankshaft, the negative pressure is supplied to the brake booster due to the pumping action of these cylinders and the brake force can be amplified.

Effects of the Invention

As described above, the running control device of a vehicle performs both the first inertia running mode performed with the rotation of the engine stopped and the second inertia running mode performed with the engine kept rotating as the inertia running mode, and the first inertia running mode performed with the rotation of the engine stopped is terminated when the brake request amount becomes equal to or greater than the relatively small first determination value α. Therefore, as a result of returning to the rotation of the engine, the amplification effect on the brake force by the brake booster can properly be acquired so that the vehicle braking force from the brake operation is ensured while the first inertia running mode is performed until the brake request amount reaches the first determination value α to stop the rotation of the engine and, therefore, an excellent fuel consumption improvement effect can be acquired.

On the other hand, since the second inertia running mode performed with the engine kept rotating is performed until the brake request amount reaches the relatively large second determination value β, the amplification effect on the brake force by the brake booster is acquired from the engine rotation can properly be acquired so that the vehicle braking force from the brake operation is ensured while excellent fuel consumption is acquired as compared to the engine brake running mode.

As described above, the first inertia running mode is performed with the rotation of the engine stopped so that the excellent fuel consumption is acquired, and is performed until the brake request amount reaches the first determination value α, while the second inertia running mode is performed with the engine kept rotating so that the amplification effect on the brake force is appropriately acquired from the brake booster, and is performed until the brake request amount reaches the second determination value β larger than the first determination value α, and therefore, as compared to the case of performing only one of the first inertia running mode and the second inertia running mode, overall fuel consumption can further be improved while the vehicle braking force from the brake operation is properly ensured.

Since a return to the engine brake running mode is made when the brake request amount becomes equal to or greater than the second determination value β during the second inertia running mode, the amplification effect on the brake force by the brake booster is acquired, a large engine brake force is also acquired from the engine brake running mode, and thus the vehicle braking force can be properly ensured.

In the second aspect of the invention, since each of the first determination value α and the second determination value β is set to smaller value in the case of a down-slope as compared to a flat road (substantially horizontal road surface), the amplification effect on the brake force by the brake booster is promptly acquired by terminating the first inertia running mode, while a large engine brake force from the engine brake running mode is promptly acquired by terminating the second inertia running mode, so that a large vehicle braking force can be ensured on a down-slope.

In the third aspect of the invention, although each of the first determination value α and the second determination value β is set to larger value in the case of an up-slope as compared to a flat road (substantially horizontal road surface), since a request for a braking force is relatively small on an up-slope, the running distance of the first inertia running mode and the second inertia running mode becomes longer while the vehicle braking force from the brake operation is ensured, resulting in a further improvement in fuel consumption.

The fourth aspect of the invention is the case of shifting to the second inertia running mode when the brake request amount becomes equal to or greater than the first determination value α during the first inertia running mode, and since the amplification effect on the brake force by the brake booster is acquired depending on the brake request amount, the fuel consumption can further be improved while the vehicle braking force is properly ensured.

In the fifth aspect of the invention, since the return to the engine brake running mode is made not only when the brake request amount becomes equal to or greater than the second determination value β during the second inertia running mode but also when the brake request amount becomes equal to or greater than the first determination value α during the first inertia running mode, this enables prompt acquisition of the large engine brake force from the engine brake running mode and the amplification effect on the brake force by the brake booster associated with the engine rotation, and the vehicle braking force can be properly ensured.

While the sixth aspect of the invention is the case that the free-run inertia running mode is performed as the first inertia running mode and the neutral inertia running mode is performed as the second inertia running mode, the seventh aspect of the invention is the case that the free-run inertia running mode is performed as the first inertia running mode and the cylinder resting inertia running mode is performed as the second inertia running mode. In both of the cases, the engine brake force is made smaller as compared to the engine brake running mode and a running distance of the inertia running mode becomes longer, resulting in improvement in fuel consumption.

MODE FOR CARRYING OUT THE INVENTION

Although the present invention is applied to a vehicle including at least an engine as a drive force source and is preferably applied to an engine drive vehicle, the present invention is also applicable to a hybrid vehicle including an electric motor or a motor generator as a drive force source in addition to the engine. The engine may be an internal combustion engine generating power from combustion of fuel. A brake operation member operated by a driver depending on a brake request amount is a brake pedal subjected to a stepping operation by a driver, for example, and the brake request amount is a depressing operation force, a depressing stroke, etc. A brake oil pressure generated via a brake booster under mechanical or electrical control depending on the brake request amount is also usable as the brake request amount.

A connecting/disconnecting device is disposed between the engine and wheels to connect and disconnect the power transmission therebetween such that the engine can be separated from the wheels. Although the connecting/disconnecting device is preferably implemented by using a hydraulic friction type clutch or brake, connecting/disconnecting devices of various types can be employed, including electrically controlling a reaction force to connect and disconnect the power transmission. An automatic transmission including pluralities of clutches and brakes and capable of being neutral is also usable.

In the engine brake running mode, all the cylinders of the engine are driven to rotate so as to generate an engine brake force from a rotation resistance such as a pumping loss and a friction torque, and the engine may be in a fuel cut (F/C) state in which fuel supply is stopped or may be in an operating state such as an idling state in which a predetermined amount of fuel is supplied. Even in the case of the idling state, the engine brake force is generated from the driven rotation at a rotation speed corresponding to a vehicle speed etc.

The first inertia running mode is, for example, a free-run inertia running mode in which the engine is separated from the wheels by the connecting/disconnecting device while the fuel supply to the engine is stopped to stop the engine rotation. The second inertia running mode is, for example, a neutral inertia running mode in which fuel is supplied to operate the engine while the engine is separated from the wheels by the connecting/disconnecting device, or a cylinder resting inertia running mode in which the fuel supply to the engine is stopped with the engine coupled to the wheels by the connecting/disconnecting device while operation of at least one of a piston and intake/exhaust valves is stopped in some of multiple cylinders. In the neutral inertia running mode, the engine is desirably operated in the idle state with substantially the minimum supply amount of fuel, for example; however, the engine may be operated in a state other than the idle state. The pistons and the intake/exhaust valves can mechanically be stopped in the cylinder resting inertia running mode by disconnecting a clutch mechanism disposed between a crankshaft and the respective pistons and the intake/exhaust valves, for example. With regard to the intake/exhaust valves, for example, if intake/exhaust valves of electromagnetic type etc. are used that can be controlled to open/close independently of the rotation of the crankshaft, the operation thereof may be stopped. Although appropriate stop positions of the intake/exhaust valves are positions where all the intake/exhaust valves are in a closed valve state, the stop positions are defined as needed, including stopping at positions where all the valves are in an opened valve state. Even when both the neutral inertia running mode and the cylinder resting inertia running mode are performed as the second inertia running mode in individual cases, the present invention is applicable. In this case, a common valve or different respective values may be set as the second determination values β.

The second inertia running mode is performed with the engine kept rotating and an engine brake force reduced as compared to that of the engine brake running mode and can supply a negative pressure to the brake booster from the rotation of the engine. Therefore, the cylinder resting inertia running mode is configured such that some of the multiple cylinders are rested while the other cylinders have the pistons and the intake/exhaust valves operated in synchronization with the rotation of the crankshaft. For example, in the case of an eight-cylinder engine, only half of the cylinders, i.e., four cylinders, are rested while the remaining four cylinders are operated, or only six cylinders are rested while the remaining two cylinders are operated. If the inertia running mode is performed with all the cylinders rested, the amplification effect on the brake force by the brake booster is reduced and, therefore, as is the case with the first inertia running mode, the inertia running mode is desirably terminated at a relatively small brake request amount such as the first determination value $\alpha$ for returning to the engine brake running mode.

The present invention is related to a determination of termination of the first inertia running mode and the second inertia running mode and the execution conditions (start conditions) of these types of the inertia running modes are defined as needed. For example, the conditions are defined such that, if an output request amount such as an accelerator operation amount is continuously in the state of zero (accelerator-off) for a certain time period or longer, the execution of the first inertia running mode is started when the brake request amount is less than the first determination value $\alpha$, while the execution of the second inertia running mode is started when the brake request amount is equal to or greater than the first determination value $\alpha$ and less than the second determination value $\beta$. Since electricity can be generated by an alternator etc. from the rotation of the engine in the second inertia running mode, the first inertia running mode may be limited depending on a necessity of electric energy when a battery remaining amount is equal to or less than a predetermined amount, so that the second inertia running mode is performed even when the brake request amount is less than the first determination value $\alpha$. Also if an engine water temperature is equal to or less than a predetermined temperature, it can be arranged that the second inertia running mode (the neutral inertia running mode) is performed for warm-up even when the brake request amount is less than the first determination value $\alpha$. If an oil pump is mechanically driven in accordance with the engine rotation, it can be arranged that the second inertia running mode is performed depending on a necessity of an oil pressure even when the brake request amount is less than the first determination value $\alpha$. If a road surface has a down-gradient, it can be arranged that the second inertia running mode enabling the brake booster to produce the amplification effect on the brake force is performed even when the brake request amount is less than the first determination value $\alpha$.

The present invention is configured at least in terms of the brake request amount such that if the execution of the first inertia running mode or the second inertia running mode is started in accordance with the execution conditions as described above, the first inertia running mode is terminated at a stage of the brake request amount smaller than that of the second inertia running mode. Another control termination condition may be defined. If the brake request amount becomes equal to or greater than the first determination value $\alpha$ while the first inertia running mode is performed, the first inertia running mode is terminated for shifting to the second inertia running mode or returning to the engine brake running mode, for example; however, a shift to another running mode can also be made. If the brake request amount becomes equal to or greater than the second determination value $\beta$ while the second inertia running mode is performed, the second inertia running mode is terminated for returning to the engine brake running mode; however, a shift to another running mode can also be made.

In the second and third aspects of the invention, the first determination value $\alpha$ and the second determination value $\beta$ are set depending on a road gradient; however, the determination values may not necessarily be set depending on the gradient in the implementation of the other aspects of the invention and may be constant values. The first determination value $\alpha$ and the second determination value $\beta$ may be set in consideration of a vehicle state other than the road gradient, for example, a battery remaining amount, an engine water temperature, or a necessity of an oil pressure. Only one of the first determination value $\alpha$ and the second determination value $\beta$ may be variable. The variable setting may vary the determination values $\alpha$ and $\beta$ continuously or in stages including two stages, and is defined in advance from a data map, a computing equation, etc.

EXAMPLE

An example of the present invention will now be described in detail with reference to the drawings.

Figure 1:
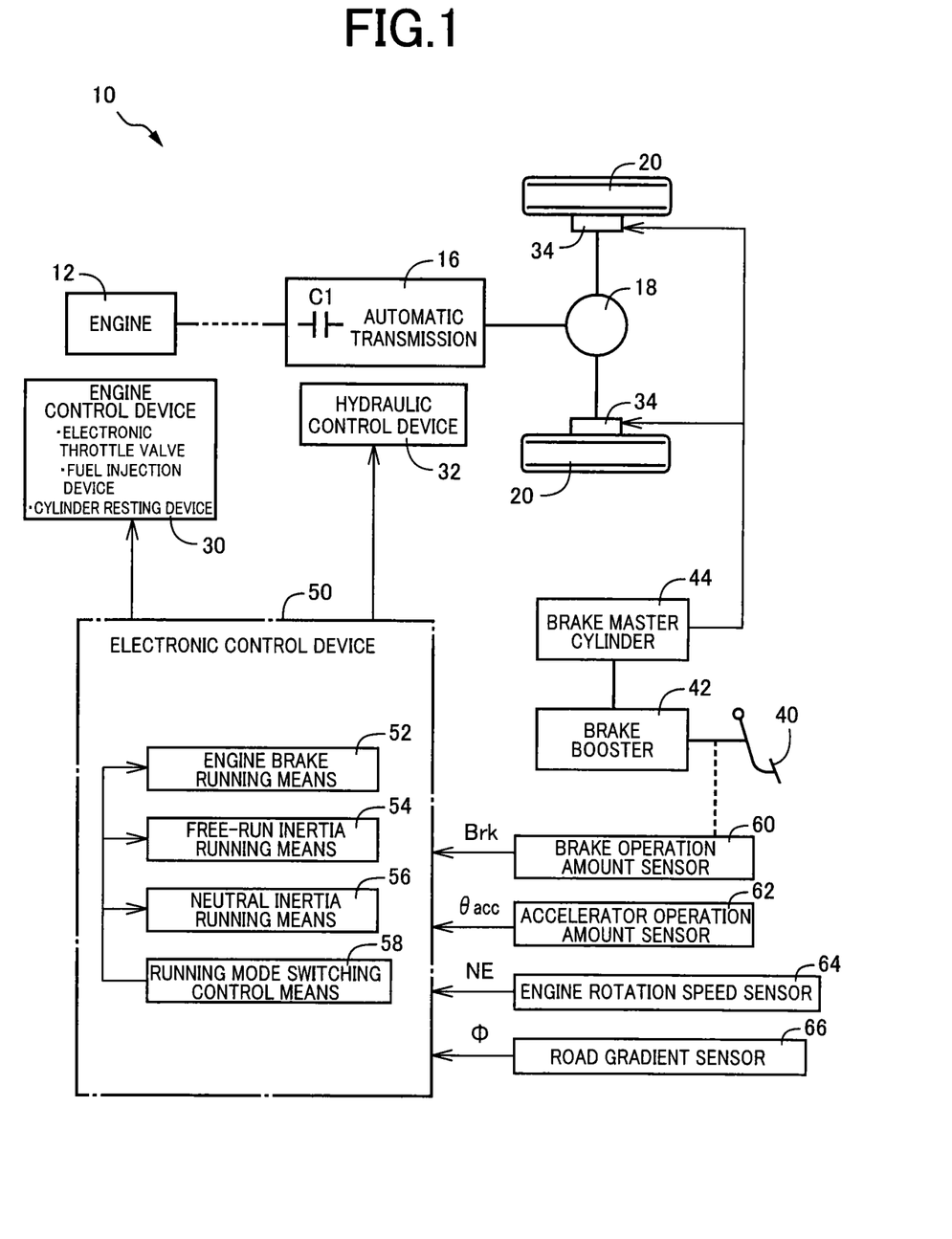
FIG. 1 is a schematic configuration diagram including a schematic of a vehicle drive device to which the present invention is preferably applied along with a main portion of a control system.

FIG. 1 is a schematic configuration diagram including a schematic of a vehicle drive device 10 to which the present invention is preferably applied along with a main portion of a control system. The vehicle drive device 10 includes as a drive force source an engine 12 that is an internal combustion engine such as a gasoline engine and a diesel engine generating power from combustion of fuel, and the output of the engine 12 is transmitted from an automatic transmission 16 via a differential gear device 18 to left and right wheels 20. A damper device and a power transmission device such as a torque converter are disposed between the engine 12 and the automatic transmission 16, and a motor generator acting as a drive force source can also be disposed therebetween.

The engine 12 includes an engine control device 30 having various pieces of equipment necessary for output control of the engine 12, such as an electronic throttle valve and a fuel injection device, and a cylinder resting device. The electronic throttle valve and the fuel injection device control an intake air amount and a fuel supply amount, respectively, and are basically controlled depending on an operation amount of an accelerator pedal (an accelerator operation amount) $\theta$acc that is an output request amount of a driver. The fuel injection device can stop the fuel supply (perform a fuel cut F/C) at the time of acceleration-off when the accelerator operation amount $\theta$acc is zero even during running of the vehicle. The cylinder resting device can mechanically separate intake/exhaust valves of some or all of multiple cylinders, for example, eight cylinders, from a crankshaft by a clutch mechanism etc. to stop the valves and, for example, all the intake/exhaust valves are stopped at positions where the valves are in a closed valve state. As a result, since a pumping loss is reduced when the engine 12 is driven to rotate in the fuel cut state, an engine brake force is reduced and a running distance of an inertia running mode can be extended. Pistons may be separated (disconnected) from the crankshaft and stopped instead of stopping the intake/exhaust valves.

The automatic transmission 16 is a stepped automatic transmission of a planetary gear type etc., having a plurality of gear stages with different gear ratios e established depending on engaged/released states of a plurality of hydraulic friction engagement devices (clutches and brakes) and is subjected to shift control by electromagnetic hydraulic control valves, switching valves, etc. disposed in a hydraulic control device 32. A clutch C1 acts as an input clutch of the automatic transmission 16 and is also subjected to engagement/release control by the hydraulic control device 32. The clutch C1 corresponds to a connecting/disconnecting device connecting and disconnecting the engine 12 and the wheels 20. The automatic transmission 16 may be implemented by using a continuously variable transmission of a belt type etc., instead of a stepped transmission.

The wheels 20 include wheel brakes 34 and a braking force is generated depending on a brake operation force (stepping force) Brk of a brake pedal 40 subjected to a stepping operation by a driver. The brake operation force Brk corresponds to a brake request amount and, in this example, a brake oil pressure is generated from a brake master cylinder 44 mechanically via a brake booster 42 depending on the brake operation force Brk so that the braking force is generated by the brake oil pressure. The brake booster 42 amplifies the brake operation force Brk by using a negative pressure generated by the rotation of the engine 12, and the brake oil pressure output from the brake master cylinder 44 is amplified such that a large braking force is acquired. The brake pedal 40 corresponds to a brake operation member.

The vehicle drive device 10 configured as described above includes an electronic control device 50. The electronic control device 50 includes a so-called microcomputer having a CPU, a ROM, a RAM, an I/O interface, etc., to execute signal processes in accordance with a program stored in advance in the ROM, while utilizing a temporary storage function of the RAM. The electronic control device 50 is supplied with a signal indicative of the brake operation force Brk from a brake operation amount sensor 60 and is supplied with a signal indicative of the accelerator operation amount θacc from an accelerator operation amount sensor 62. The electronic control device 50 is also supplied with a signal indicative of a rotation speed (engine rotation speed) NE of the engine 12 from an engine rotation speed sensor 64 and a signal indicative of a road gradient Φ from a road gradient sensor 66. Other various pieces of information necessary for various controls are also supplied. Although the road gradient sensor 66 is a G (acceleration) sensor, the road gradient Φ can also be obtained by a calculation from the output of the engine 12 and a change in the vehicle speed V.

The electronic control device 50 functionally includes an engine brake running means 52, a free-run inertia running means 54, a neutral inertia running means 56, and a running mode switching control means 58. The engine brake running means 52, the free-run inertia running means 54, and the neutral inertia running means 56 are for the purpose of performing three respective running modes depicted in FIG. 2 and the engine brake running means 52 performs an engine brake running mode (hereinafter also referred as "engine brake running"). The engine brake running mode is performed with a coupling state between the engine 12 and the wheels 20 maintained at the time of accelerator-off, and all the cylinders of the engine 12 are driven to rotate to generate an engine brake force from a pumping loss and a friction torque. Although the engine 12 may be in a fuel cut state in which fuel supply is stopped, the engine 12 is controlled in an idling state in which a minimum amount of fuel is supplied as is the case with the time of the accelerator-off in this example. The automatic transmission 16 has a predetermined gear stage established depending on the vehicle speed V etc., and the clutch C1 is retained in an engaged state. As a result, the engine 12 is driven to rotate at a predetermined rotation speed determined depending on the vehicle speed V and the gear ratio e and the engine brake force having a magnitude corresponding to the rotation speed is generated. Since the engine 12 is driven to rotate at a predetermined rotation speed, the amplification effect on the brake operation force Brk is appropriately acquired from the brake booster 42 using the negative pressure generated from the engine rotation, and the vehicle braking force from the brake operation is sufficiently acquired. "Negative pressure supply" of FIG. 2 indicates the presence/absence of supply (charge) of a negative pressure to a negative pressure tank of the brake booster 42 and, if the negative pressure supply is absent, the negative pressure in the negative pressure tank is reduced (comes closer to an atmospheric pressure) due to repeated operations of the brake pedal 40, resulting in a reduction in the amplification effect on the brake operation force Brk.

Figure 2:
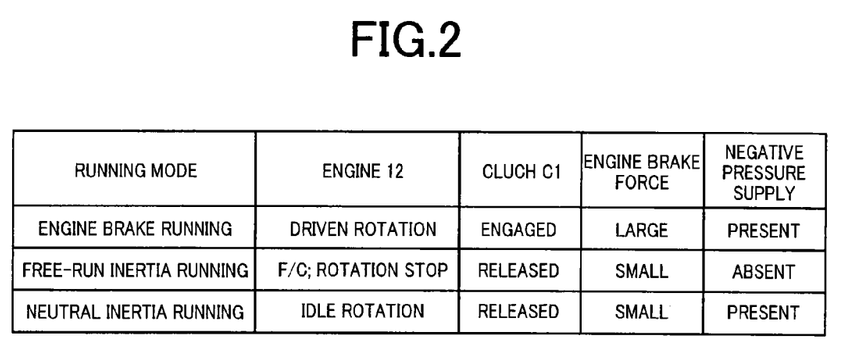
FIG. 2 is a diagram for explaining three kinds of running modes performed by the vehicle drive device of FIG. 1.

The free-run inertia running means 54 performs a free-run inertia running mode (hereinafter also referred as "free-run inertia running") at the time of accelerator-off. The free-run inertia running mode is performed by releasing the clutch C1 to separate (disconnect) the engine 12 from the wheels 20 while a fuel cut F/C is performed to stop the fuel supply to the engine 12 so that the rotation of the engine 12 is stopped. In this case, since the engine brake force becomes smaller than that of the engine brake running mode and the release of the clutch C1 results in the engine brake force of substantially zero, a reduction in running resistance extends the running distance of the inertia running mode, and fuel consumption can be improved. On the other hand, the stop of the rotation of the engine 12 results in a reduction in the amplification effect on the brake operation force Brk by the brake booster 42 using the negative pressure generated from the engine rotation. In this example, the free-run inertia running mode is performed as a first inertia running mode.

The neutral inertia running means 56 performs a neutral inertia running mode (hereinafter also referred as "neutral inertia running") at the time of accelerator-off. The neutral inertia running mode is performed by releasing the clutch C1 to separate the engine 12 from the wheels 20 while fuel is supplied to allow the engine 12 to rotate in the idling state (perform self-sustaining rotation). Also in this case, since the engine brake force becomes smaller than that of the engine brake running mode and the release of the clutch C1 results in the engine brake force of substantially zero, a reduction in running resistance extends the running distance of the inertia running mode, and fuel consumption can be improved. On the other hand, since the engine 12 is rotated in the idling state, the amplification effect on the brake operation force Brk can be properly acquired from the brake booster 42 using the negative pressure generated from the engine rotation and the vehicle braking force from the brake operation is ensured. Although fuel is consumed by operating the engine 12 in the idling state, since the distance of the inertia running mode becomes longer as compared to the engine brake running mode, a frequency of reacceleration is reduced and overall fuel consumption is improved. In this example, the neutral inertia running mode is performed as a second inertia running mode.

Figure 3:
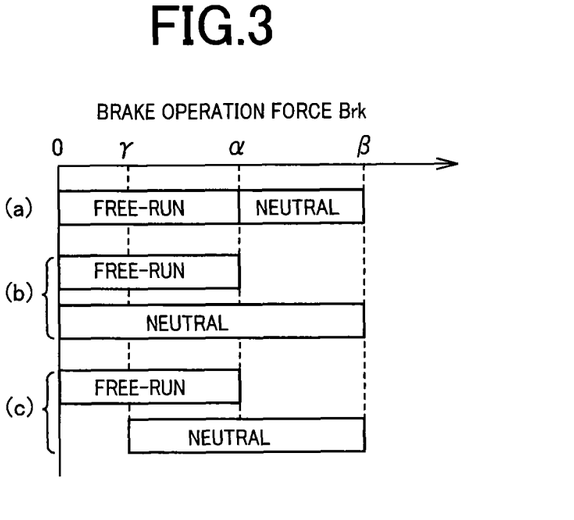
FIG. 3 is a diagram for explaining a difference between execution ranges in terms of brake operation forces Brk of a free-run inertia running mode and a neutral inertia running mode performed by the vehicle drive device of FIG. 1.

The running mode switching control means 58 switches three running modes of the engine brake running mode, the free-run inertia running mode, and the neutral inertia running mode and switches the running modes in terms of the brake operation force Brk in accordance with an individual case (an execution condition) indicated by any one of (a) to (c) of FIG. 3, for example. The individual cases may be defined such that at least the brake operation force Brk is involved, and the execution may be started or terminated in accordance with a condition other than the brake operation force Brk.

In FIG. 3, (a) indicates that the free-run inertia running mode is performed when the brake operation force Brk is less than the first determination value α, including during brake-off (non-operation), that the neutral inertia running mode is performed when the brake operation force Brk is equal to or greater than the first determination value α and less than the second determination value β, and that the engine brake running mode is performed when the brake operation force Brk is equal to or greater than the second determination value β. The first determination value α is an upper limit value for performing the free-run inertia running mode and, when the brake operation force Brk becomes equal to or greater than the first determination value α, the free-run inertia running mode is terminated. The second determination value β is an upper limit value for performing the neutral inertia running mode and, when the brake operation force Brk becomes equal to or greater than the second determination value β, the neutral inertia running mode is terminated. The first determination value α is smaller than the second determination value β and, if a depressing operation of the brake pedal 40 is performed, the free-run inertia running mode is terminated at a smaller brake operation force Brk as compared to the neutral inertia running mode.

In the case of (b), the free-run inertia running mode is performed when the brake operation force Brk is less than the first determination value α, including during brake-off, as is the case with (a); however, a difference is that the neutral inertia running mode is performed when the brake operation force Brk is less than the second determination value β, including during brake-off. In this case, when the brake operation force Brk is less than the first determination value α, the free-run inertia running mode and the neutral inertia running mode are performed in accordance with predefined individual cases. For example, since electricity can be generated by an alternator etc. from the rotation of the engine 12 in the neutral inertia running mode, the free-run inertia running mode may be limited depending on a necessity of electric energy when a battery remaining amount is equal to or less than a predetermined amount, so that the neutral inertia running mode is performed even when the brake operation force Brk is less than the first determination value α. Also if an engine water temperature is equal to or less than a predetermined temperature, the neutral inertia running mode is performed for warm-up even when the brake operation force Brk is less than the first determination value α. If the oil pump is mechanically driven in accordance with the engine rotation, the neutral inertia running mode may be performed depending on a necessity of an oil pressure even when the brake operation force Brk is less than the first determination value α, and various other execution conditions can be set. In this case, if the brake operation force Brk becomes equal to or greater than the first determination value α while the free-run inertia running mode is being performed at the brake operation force Brk less than the first determination value α, a switchover to the neutral inertia running mode is desirably performed, or alternatively, a shift to the engine brake running mode may directly be made.

Although (c) is substantially the same as (b) described above, a third determination value γ is set as an execution lower limit value for the neutral inertia running mode separately from the brake operation force Brk=0 corresponding to brake-off in this case and is set to a value smaller than the first determination value α. In this case, when the brake operation force Brk is less than the third determination value γ, the free-run inertia running mode is performed regardless of the battery remaining amount, the engine water temperature, and the necessity of the oil pressure and, if the brake operation force Brk becomes equal to or greater than the third determination value γ, a switchover to the neutral inertia running mode may be performed as needed, or alternatively, if the brake operation force Brk becomes equal to or greater than the third determination value γ, the neutral inertia running mode may be performed without performing the free-run inertia running mode.

Figure 4:
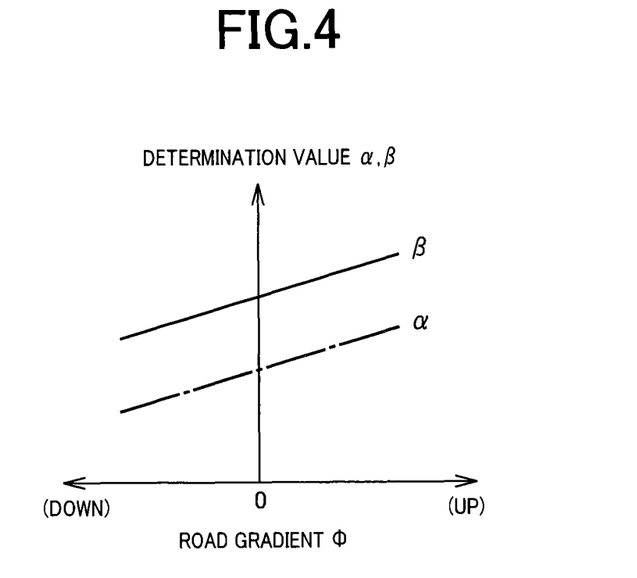
FIG. 4 is a diagram for indicating an example of a data map when the determination values α, β of FIG. 3 are set depending on a road gradient Φ.

The determination values α and β may be defined as constant values in advance or may be set by using the road gradient Φ as a parameter as depicted in FIG. 4, for example. In particular, since a larger braking force is generally required on a down-slope when a road gradient is negative as compared to a substantially horizontal flat road (Φ≈0), the determination values α and β are made smaller to make a shift from the free-run inertia running mode to the neutral inertia running mode at a smaller brake operation force Brk so that the amplification effect on the brake operation force Brk by the brake booster 42 can properly be acquired, or a return to the engine brake running mode is made so that a larger engine brake force is acquired. In contrast, a request for a braking force is low on an up-slope when a road gradient is positive as compared to a substantially horizontal flat road (Φ≈0), the determination values α and β are made larger to expand execution ranges of the free-run inertia running mode and the neutral inertia running mode so that the fuel consumption can further be improved. The determination values α and β as described above are defined in advance from a data map, a computing equation, etc. The determination value γ may also be set by using the road gradient Φ as a parameter as is the case with the determination values α and β.

Figure 5:
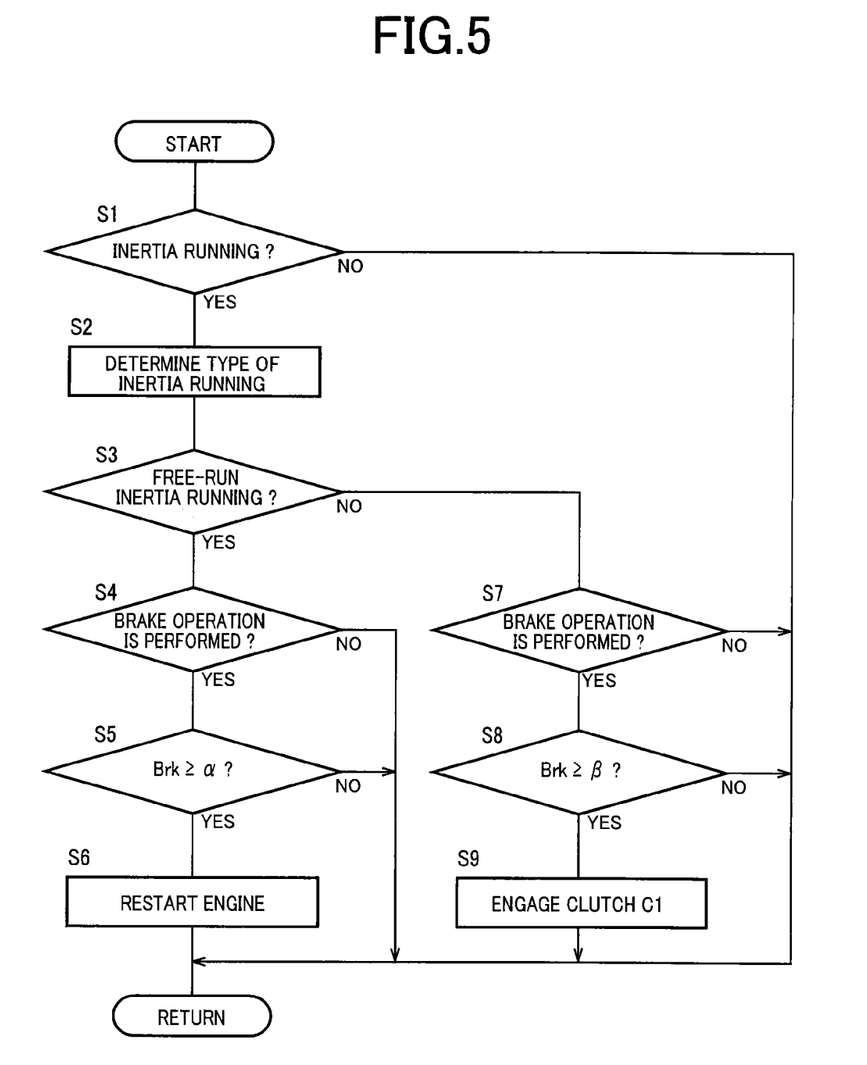
FIG. 5 is a flow chart for explaining an operation of a termination determination of the inertia running mode performed by the electronic control device of FIG. 1.

FIG. 5 is a flowchart of an operation of making a determination of termination of the free-run inertia running mode and the neutral inertia running mode by the running mode switching control means 58 and making the switch to another running mode. At step S1, it is determined whether any of the free-run inertia running mode and the neutral inertia running mode is being performed and, if any inertia running mode is being performed, a type of the inertia running modes is determined at step S2. The determinations on whether the inertia running mode is being performed and the type of the inertia running modes may be made from the state of the engine 12 and the state of the clutch C1 depicted in FIG. 2, for example, or may be made from a flag etc. indicative of a type of the inertia running modes. At step S3, the individual case is determined based on whether the inertia running mode is the free-run inertia running mode and, the process from step S4 is performed in the case of the free-run inertia running mode, or the process from step S7 is executed in the case of the neutral inertia running mode.

At step S4, it is determined whether a brake operation is performed, based on the brake operation force Brk etc., and if a brake operation is not performed, the process is terminated to repeat from step S1, or if a brake operation is performed, step S5 is executed. At step S5, it is determined whether the brake operation force Brk is equal to or greater than the first determination value α and, if Brk<α is satisfied, the process is terminated, or if Brk≥α is satisfied, the engine 12 is restarted at step S6 to terminate the free-run inertia running mode. The process after step S6 differs depending on the individual cases of (a) to (c) of FIG. 3.

Figure 6:
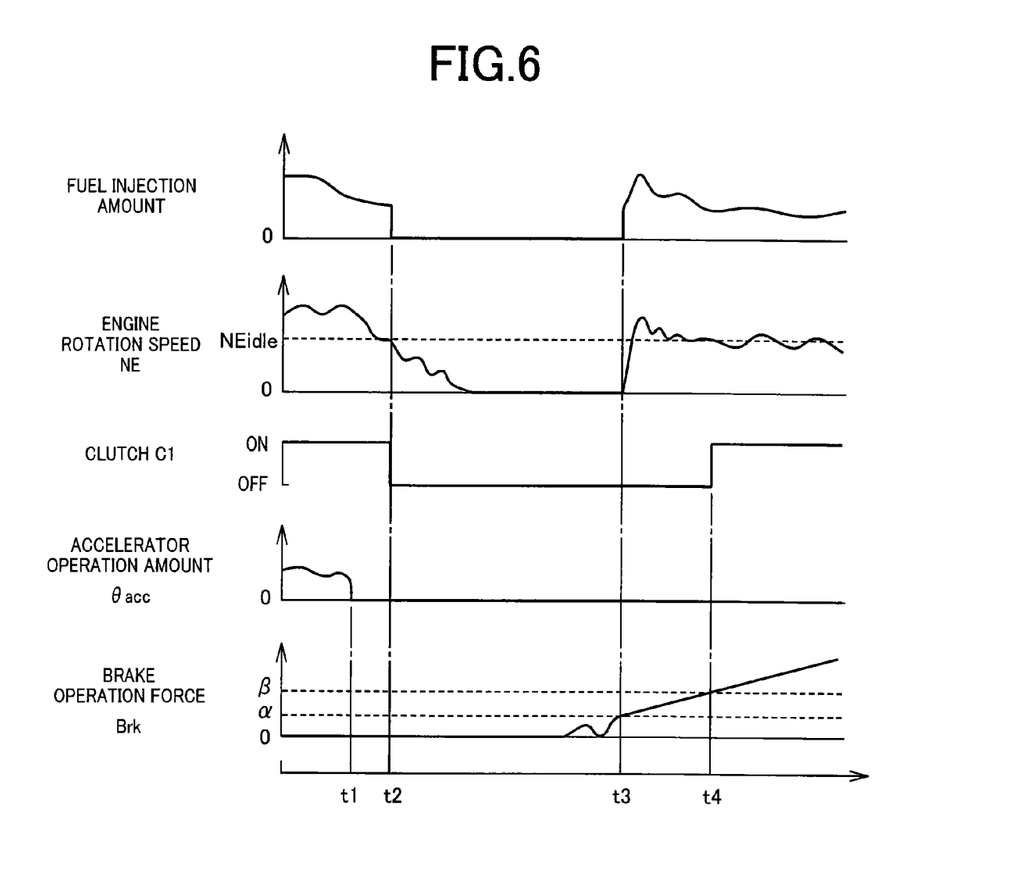
FIG. 6 is an example of a time chart indicative of a change in an operation state of portions when a shift from the free-run inertia running mode to the neutral inertia running mode is made and further a shift to engine brake running mode is made in accordance with the flow chart of FIG. 5.

FIG. 6 is an example of a time chart of changes in operation states of the portions when the shift is made from the free-run inertia running mode to the neutral inertia running mode and, although FIG. 6 depicts the case of (a) of FIG. 3, the control is provided also in the case of (b) or (c) of FIG. 3 as depicted in FIG. 6 under a certain condition. Time t1 of FIG. 6 is the time of accelerator-off and, after a certain time has elapsed (at time t2), the clutch C1 is released (OFF) and a fuel cut is performed to start the free-run inertia running mode. Time t3 is the time when the brake operation force Brk becomes equal to or greater than the first determination value $\alpha$ and the determination of step S5 becomes YES (affirmative) to restart the engine 12 and, as a result, a shift to the neutral inertia running mode is made. Subsequently, the process from step S1 of FIG. 5 is repeatedly executed to make a determination of termination of the neutral inertia running mode.

Figure 7:
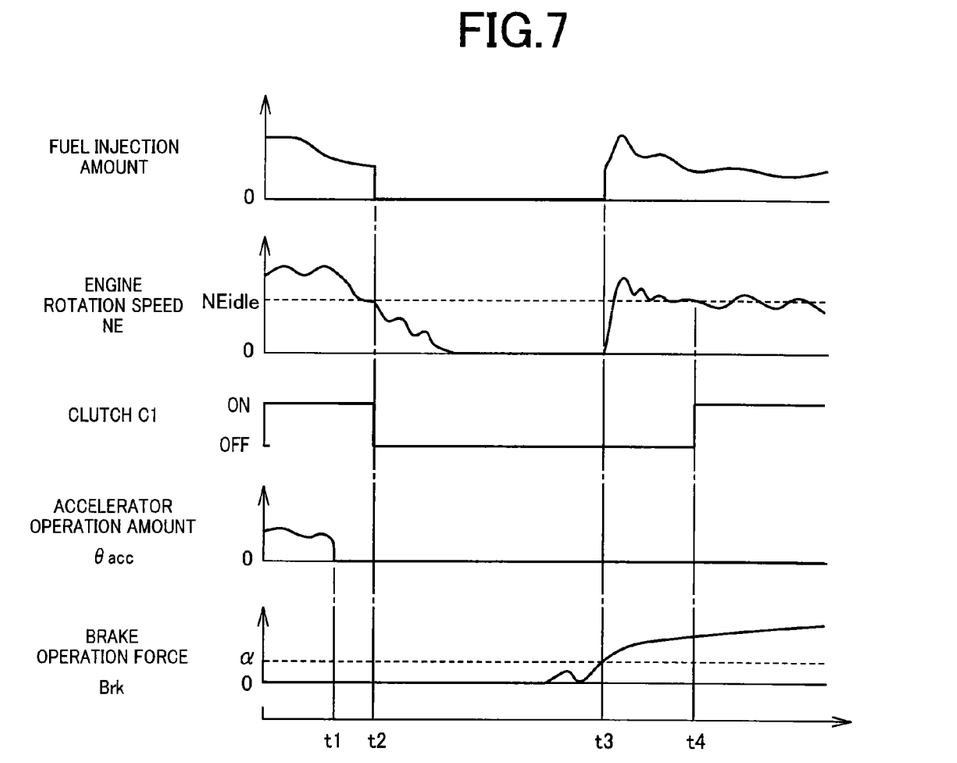
FIG. 7 is an example of a time chart indicative of a change in an operation state of portions when a shift from the free-run inertia running mode to the engine brake running mode is made in accordance with the flow chart of FIG. 5.

In the case of FIG. 7, the engine 12 is restarted at step S6 to terminate the inertia running mode and directly return to the engine brake running mode and the control is provided in the case of (b) or (c) of FIG. 3 as depicted in FIG. 7 under a certain condition. Although times t1 to t3 are the same as FIG. 6, when the engine rotation speed NE substantially stabilizes at around an idle rotation speed NEidle (time t4), the clutch C1 is engaged (ON) to return to the engine brake running mode.

Returning to FIG. 5, if the determination of step S3 is NO (negative), i.e., if the neutral inertia running mode is being performed, it is determined at step S7 whether a brake operation is performed, based on the brake operation force Brk etc. If a brake operation is not performed, the process is terminated to repeat from step S1, or if a brake operation is performed, step S8 is executed. At step S8, it is determined whether the brake operation force Brk is equal to or greater than the second determination value $\beta$ and, if Brk<$\beta$ is satisfied, the process is terminated, or if Brk≥$\beta$ is satisfied, the clutch C1 is engaged at step S9 to terminate the neutral inertia running mode and return to the engine brake running mode. Time t4 of FIG. 6 is the time when the brake operation force Brk becomes equal to or greater than the second determination value $\beta$ and the determination of step S8 becomes YES to engage the clutch C1.

Figure 8:
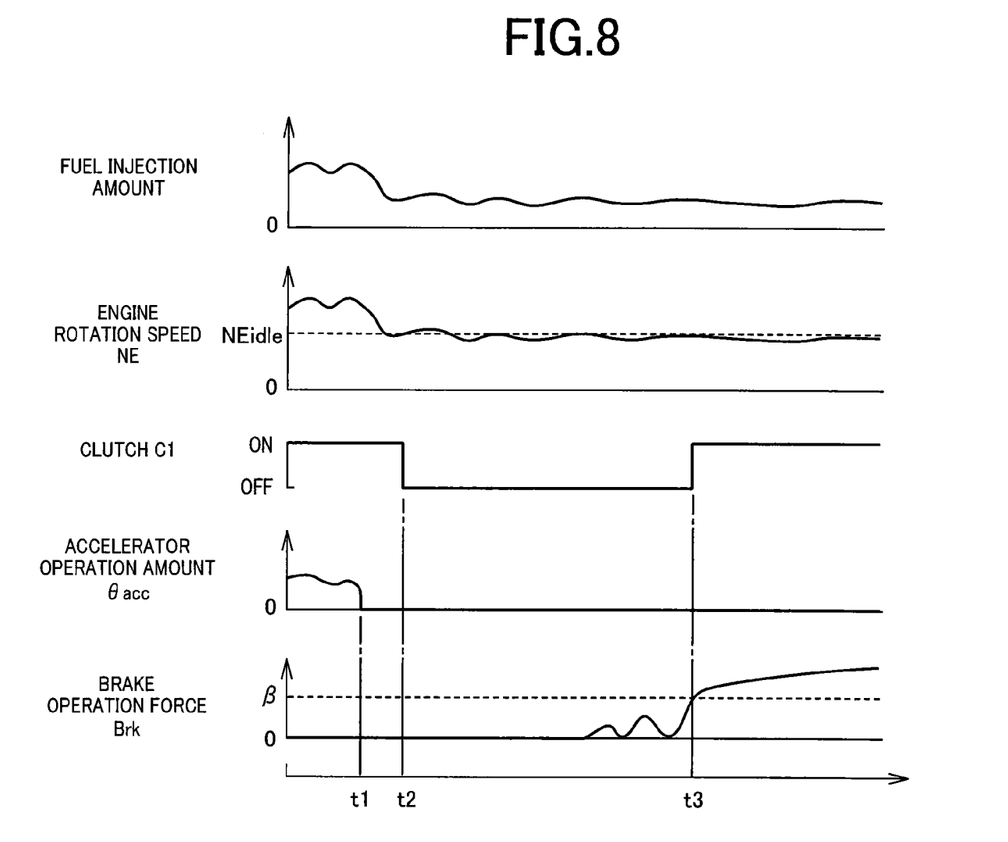
FIG. 8 is an example of a time chart indicative of a change in an operation state of portions when a shift from the neutral inertia running mode to the engine brake running mode is made in accordance with the flow chart of FIG. 5.

FIG. 8 depicts the case of performing the neutral inertia running mode from the start of the inertia running mode and the control is provided in the case of (b) of FIG. 3 as depicted in FIG. 8 under a certain condition. Time t1 of FIG. 8 is the time of accelerator-off and, after a certain time has elapsed (at time t2), the clutch C1 is released to start the neutral inertia running mode. The engine 12 is maintained in the idling state associated with accelerator-off. Time t3 is the time when the brake operation force Brk becomes equal to or greater than the second determination value $\beta$ and the determination of step S8 becomes YES to engage the clutch C1. As a result, the neutral inertia running mode is terminated to return to the engine brake running mode.

As described above, the vehicle drive device 10 of this example performs both the free-run inertia running mode performed with the rotation of the engine 12 stopped and the neutral inertia running mode performed with the engine 12 kept rotating as the inertia running mode, and the free-run inertia running mode performed with the rotation of the engine 12 stopped is terminated when the brake operation force Brk becomes equal to or greater than the relatively small first determination value $\alpha$, and the engine 12 is restarted at step S6. As a result of returning to the rotation of the engine 12, the amplification effect on the brake operation force Brk by the brake booster 42 can properly be acquired so that the vehicle braking force from the brake operation is ensured while the free-run inertia running mode is performed until the brake operation force Brk reaches the first determination value $\alpha$ to stop the rotation of the engine 12 and, therefore, an excellent fuel consumption improvement effect can be acquired.

On the other hand, since the neutral inertia running mode performed with the engine 12 kept rotating is performed until the brake operation force Brk reaches the relatively large second determination value $\beta$, the amplification effect on the brake operation force Brk by the brake booster 42 is acquired from the engine rotation so that the vehicle braking force from the brake operation is ensured while excellent fuel consumption is acquired as compared to the engine brake running mode.

As described above, the free-run inertia running mode is performed with the rotation of the engine 12 stopped so that the excellent fuel consumption is acquired, and is performed until the brake operation force Brk reaches the first determination value $\alpha$, while the neutral inertia running mode is performed with the engine 12 kept rotating so that the amplification effect on the brake operation force Brk is appropriately acquired from the brake booster 42, and is performed until the brake operation force Brk reaches the second determination value $\beta$ larger than the first determination value $\alpha$, and therefore, as compared to the case of performing only one of the free-run inertia running mode and the neutral inertia running mode, overall fuel consumption can further be improved while the vehicle braking force from the brake operation is ensured.

Since each of the first determination value $\alpha$ and the second determination value $\beta$ is set to smaller value in the case of a down-slope as compared to a flat road, the amplification effect of the brake booster 42 is promptly acquired by terminating the free-run inertia running mode, while a large engine brake force from the engine brake running mode is promptly acquired by terminating the neutral inertia running mode, so that a large vehicle braking force can be ensured on a down-slope.

Although each of the first determination value $\alpha$ and the second determination value $\beta$ is set to larger value in the case of an up-slope as compared to a flat road, since a request for a braking force is relatively small on an up-slope, the execution ranges of the free-run inertia running mode and the neutral inertia running mode are expanded while the vehicle braking force from the brake operation is ensured, resulting in a longer running distance of the inertia running mode and a further improvement in fuel consumption.

As depicted in the time chart of FIG. 6, if the shift to the neutral inertia running mode is made when the brake operation force Brk becomes equal to or greater than the first determination value $\alpha$ during the free-run inertia running mode and the return to the engine brake running mode is made when the brake operation force Brk becomes equal to or greater than the second determination value $\beta$ during the neutral inertia running mode, since the amplification effect on the brake operation force Brk by the brake booster 42 is acquired depending on the brake operation force Brk and a large engine brake force is also acquired from the engine brake running mode, the fuel consumption can further be improved while the vehicle braking force is properly ensured.

As depicted in FIG. 7, if the return to the engine brake running mode is immediately made when the brake operation force Brk becomes equal to or greater than the first determination value $\alpha$ during the free-run inertia running mode, this enables prompt acquisition of the large engine brake force from the engine brake running mode and the amplification effect on the brake operation force Brk by the brake booster 42 associated with the engine rotation, and a large vehicle braking force is ensured.

In both the free-run inertia running mode performed as the first inertia running mode and the neutral inertia running mode performed as the second inertia running mode, the clutch C1 is released to make the engine brake force substantially zero and the engine brake force is considerably reduced as compared to the engine brake running mode, resulting in a longer running distance of the inertia running mode and an improvement in fuel consumption. Although the neutral inertia running mode deteriorates the fuel consumption because the engine 12 is operated in the idling state, the running distance of the inertia running mode is extended and the frequency of reacceleration is reduced, the fuel consumption can sufficiently be improved as compared to the engine brake running mode.

Another example of the present invention will be described.

Figure 9:
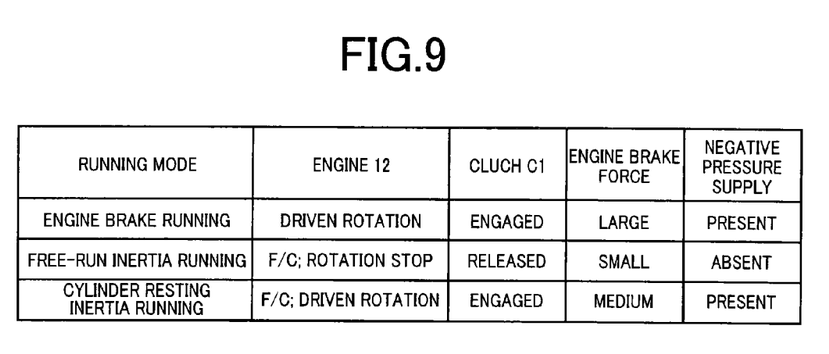
FIG. 9 is a diagram for explaining another example of the present invention and a diagram for explaining three kinds of running modes performed by the vehicle drive device of FIG. 1.

Although the neutral inertia running mode is performed as the second inertia running mode in the example, the cylinder resting inertia running mode may be performed instead of the neutral inertia running mode as depicted in FIG. 9. In particular, a cylinder resting inertia running means is disposed instead of the neutral inertia running means 56 to perform the cylinder resting inertia running mode. In the cylinder resting inertia running mode, the fuel supply to the engine 12 is stopped (a fuel cut F/C is performed) while the engagement state of the clutch C1 is maintained with the engine 12 and the wheels 20 coupled, and the cylinder resting device of the engine control device 30 stops the intake/exhaust valves in some (e.g., half) of multiple cylinders all at the positions where the valves are in the closed valve state. In this case, since the intake/exhaust valves are stopped in the closed valve state although the crankshaft is driven to rotate depending on the vehicle speed V and the gear stage of the automatic transmission 16, a loss due to a pumping action becomes smaller as compared to the case of opening/closing in synchronization with the crankshaft, and the engine brake force is reduced as compared to the engine brake running mode. As a result, the running distance of the inertia running mode is extended and the fuel consumption is improved. Since only some of the multiple cylinders are rested and the remaining cylinders have the intake/exhaust valves opened and closed in synchronization with the crankshaft, the negative pressure is supplied to the brake booster 42 due to the pumping action of these cylinders and the amplification effect on the brake operation force Brk is acquired.

As compared to the neutral inertia running mode, therefore, the engine brake force is large and the running distance of the inertia running mode is relatively short; however, since the engine 12 is simply driven to rotate due to the fuel cut, the efficiency of the fuel consumption is at a comparable level with, or equal to or greater than, that of the neutral inertia running mode. Since only some cylinders are rested and the remaining cylinders generate a negative pressure from the pumping action, the amplification effect on the brake operation force Brk by the brake booster 42 is acquired as is the case with the neutral inertia running mode. As a result, even when the cylinder resting inertia running mode is performed instead of the neutral inertia running mode in the example, the same effect as the example is acquired. In this case, if a shift is made from the free-run inertia running mode to the cylinder resting inertia running mode, the clutch C1 may be engaged so that the engine 12 is driven to rotate and the intake/exhaust valves in some of the cylinders may be stopped at the closed valve positions by the cylinder resting device. In the case of returning from the cylinder resting inertia running mode to the engine brake running mode, the intake/exhaust valves stopped by the cylinder resting device may be released such that the intake/exhaust valves are coupled to the crankshaft and driven to open/close, and the fuel injection to the engine 12 may be restarted to operate the engine 12 in the idling state.

The execution condition for performing the cylinder resting inertia running mode and the second determination value β of the brake operation force Brk for terminating the execution of the cylinder resting inertia running mode may be the same as the example, or may be set to different values. The neutral inertia running mode and the cylinder resting inertia running mode may be performed as the second inertia running mode in the individual cases.

Figure 10:
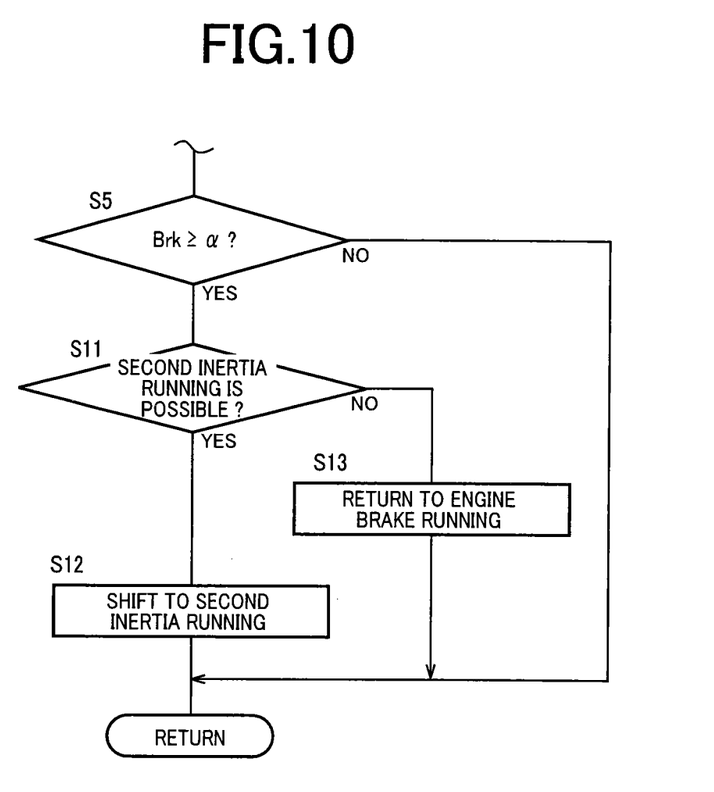
FIG. 10 is a diagram for explaining yet another example of the present invention and a flow chart for explaining another example of operations from step S5 of FIG. 5.

In the example, if the determination of step S5 is YES in the flowchart of FIG. 5, the engine 12 is restarted at step S6; however, for example, a configuration as depicted in FIG. 10 is also available. In particular, when the determination of step S5 is YES, it is determined at step S11 whether the second inertia running mode (the neutral inertia running mode or the cylinder resting inertia running mode) is possible in accordance with the execution condition and, if possible, a shift to the second inertia running mode is made at step S12. If the second inertia running mode is impossible, step S13 is executed to restart the engine 12 and engage the clutch C1 for immediately returning to the engine brake running mode. Also in this case, substantially the same effect as the example is acquired.

Although the examples of the present invention have been described in detail with reference to the drawings, these examples are merely an embodiment and the present invention can be implemented in variously modified and improved forms based on the knowledge of those skilled in the art.

NOMENCLATURE OF ELEMENTS

10: vehicle drive device 12: engine 20: wheels 40: brake pedal (brake operation member) 42: brake booster 50: electronic control device 52: engine brake running means 54: free-run inertia running means (first inertia running mode) 56: neutral inertia running means (second inertia running mode) 58: running mode switching control means 60: brake operation amount sensor 66: road gradient sensor Brk: brake operation force (brake request amount) Φ: road gradient α: first determination value β: second determination value

The invention claimed is:

1. A running control device of a vehicle including an engine, wheels, a connecting/disconnecting device disposed between the engine and the wheels which is placed in an engaged state for connecting the engine and the wheels and is placed in a released state for disconnecting the engine from the wheels, a brake operation member operated depending on a brake request amount of a driver, and a brake booster amplifying a brake force by using a negative pressure generated by rotation of the engine, the running control device comprising:
   circuitry configured to:
   execute an engine brake running mode performed with the engine coupled to wheels such that an engine brake is applied by driven rotation of the engine and an inertia running mode performed with an engine brake force made lower than that in the engine brake running mode, the brake request amount being included as a condition for terminating the inertia running mode,
   execute a first inertia running mode performed with the connecting/disconnecting device placed in the released state and with the rotation of the engine stopped and a second inertia running mode performed with the connecting/disconnecting device placed in the released state and with the engine kept rotating, in accordance with predefined respective execution conditions as the inertia running mode,
   terminate the first inertia running mode when the brake request amount becomes equal to or greater than a predefined first determination value while the first inertia running mode is performed, and terminate the second inertia running mode and return to the engine brake running mode when the brake request amount becomes equal to or greater than a predefined second determination value larger than the first determination value while the second inertia running mode is performed.

2. The running control device of a vehicle of claim 1, wherein each of the first determination value and the second determination value is set depending on a road gradient and is defined to have a smaller value in the case of a down-slope as compared to a flat road.

3. The running control device of a vehicle of claim 1, wherein each of the first determination value and the second determination value is set depending on a road gradient and is defined to have a larger value in the case of an up-slope as compared to a flat road.

4. The running control device of a vehicle of claim 1, wherein the circuitry is configured to make a shift to the second inertia running mode when the brake request amount becomes equal to or greater than the first determination value during the first inertia running mode.

5. The running control device of a vehicle of claim 1, wherein the circuitry is configured to make a return to the engine brake running mode when the brake request amount becomes equal to or greater than the first determination value during the first inertia running mode.

6. The running control device of a vehicle of claim 1, wherein
the first inertia running mode is a free-run inertia running mode in which the engine is separated from the wheels with fuel supply to the engine stopped to stop rotation of the engine, and
the second inertia running mode is a neutral inertia running mode in which fuel is supplied to operate the engine while the engine is separated from the wheels.

7. The running control device of a vehicle of claim 1, wherein
the first inertia running mode is a free-run inertia running mode in which the engine is separated from the wheels with fuel supply to the engine stopped to stop rotation of the engine, and
the second inertia running mode is a cylinder resting inertia running mode in which fuel supply to the engine is stopped with the engine coupled to the wheels while operation of a piston and intake/exhaust valves of at least one of multiple cylinders of the engine is stopped.

* * * * *